United States Patent [19]
McCartney

[11] Patent Number: 5,874,788
[45] Date of Patent: Feb. 23, 1999

[54] EXTERNAL BACKUP POWER SUPPLY

[75] Inventor: Thomas McCartney, Bannockburn, Ill.

[73] Assignee: Oneac Corporation, Libertyville, Ill.

[21] Appl. No.: 46,127

[22] Filed: Apr. 12, 1993

Related U.S. Application Data

[63] Continuation of Ser. No. 578,952, Sep. 7, 1990, abandoned.

[51] Int. Cl.$^6$ .................................................... H02J 7/00
[52] U.S. Cl. ............................................................... 307/66
[58] Field of Search ................................. 307/66, 64, 44, 307/46, 85–87; 361/245, 246; 363/143

[56] References Cited

U.S. PATENT DOCUMENTS

| | | | |
|---|---|---|---|
| 3,745,453 | 7/1973 | Wright | 361/46 |
| 3,784,841 | 1/1974 | Hosaka | 307/64 |
| 3,790,822 | 2/1974 | Giebler | 307/254 |
| 4,065,676 | 12/1977 | Elias | 307/66 |
| 4,313,060 | 1/1982 | Fickenscher et al. | 307/66 |
| 4,327,298 | 4/1982 | Burgin | 307/66 |
| 4,340,823 | 7/1982 | Miyazawa | 307/66 |
| 4,362,951 | 12/1982 | Turner et al. | 307/64 |
| 4,366,389 | 12/1982 | Hussey | 307/66 |
| 4,395,639 | 7/1983 | Bring | 307/66 |
| 4,400,626 | 8/1983 | Lacy | 307/66 |
| 4,401,895 | 8/1983 | Petkovsek | 307/66 |
| 4,468,571 | 8/1984 | Heavey et al. | 307/66 |
| 4,560,887 | 12/1985 | Schneider | 307/66 |
| 4,627,483 | 12/1986 | Harshbarger, III et al. | 165/2 |
| 4,647,787 | 3/1987 | Pommer, II | 307/66 |
| 4,837,672 | 6/1989 | Donze | 363/143 |
| 4,884,013 | 11/1989 | Jackson et al. | 128/DIG. 1 |
| 4,885,521 | 12/1989 | Crampton | 307/66 |

OTHER PUBLICATIONS

European Patent Office publication No. EP 0 079 462 A2, by Manfred Scharfenberg, dated May 25, 1983.
European Search Report for Application No. EP91114927.6, dated Jan. 26, 1994.
Small, Charles H., "Auxiliary Battery Inputs Transform Switchers into Uninterruptible Power Supplies," Jun. 23, 1983, vol. 28 (1983), No. 13, pp. 143–148, *E.D.N. Electrical Design News*.
European Patent Office publication No. EP 0 077 531 A1 by Billot et al., dated Apr. 27, 1983.

*Primary Examiner*—Richard T. Elms
*Attorney, Agent, or Firm*—Mason, Kolehmainen, Rathburn and Wyss; Joan Pennington

[57] ABSTRACT

An external DC (direct current) power supply is provided for supplying backup DC power to a supported device having an AC input connector. The power supply includes an AC (alternating current) voltage source. A voltage rectifier is coupled to the AC voltage source for rectifying the AC voltage source. An energy storage device coupled in parallel to the voltage rectifier provides a predetermined DC voltage threshold level. A connector of the external DC power supply applies a power output of the parallel combination of the voltage rectifier and the energy storage device to the AC input connector of the supported device. The external DC power supply is capable of reliably, effectively and efficiently supplying backup power to the AC power input of a supported system without requiring any special wiring or modification of the supported system using only the AC input plug for connection to the supported system.

24 Claims, 3 Drawing Sheets

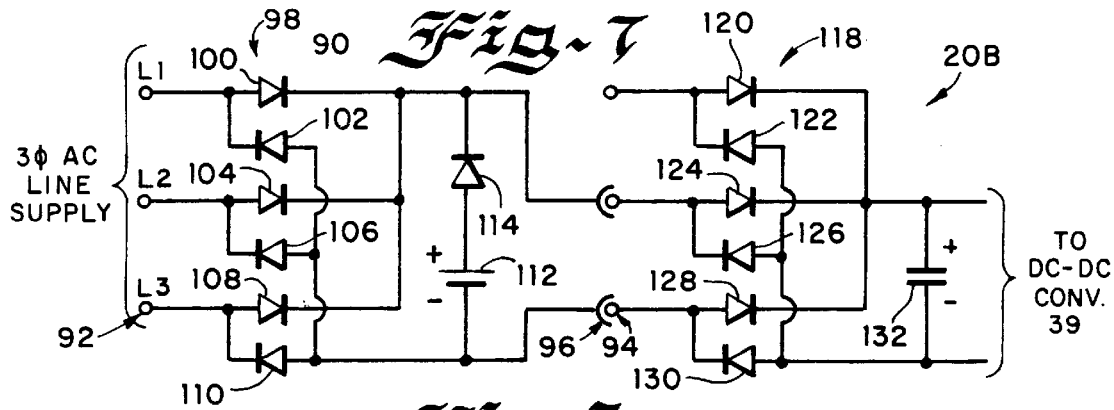
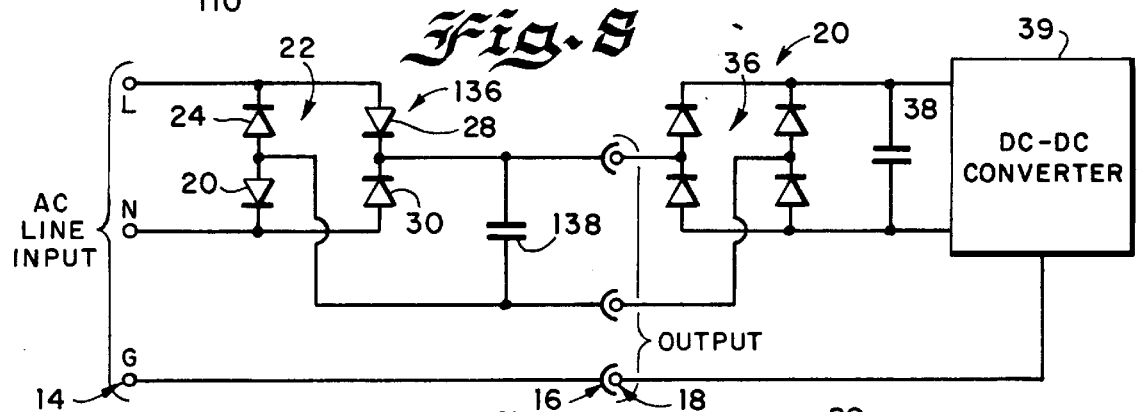
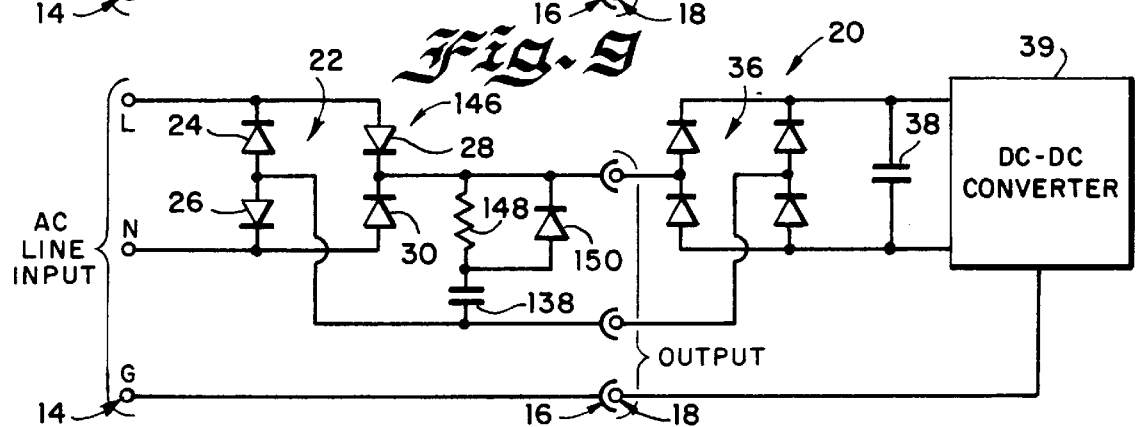
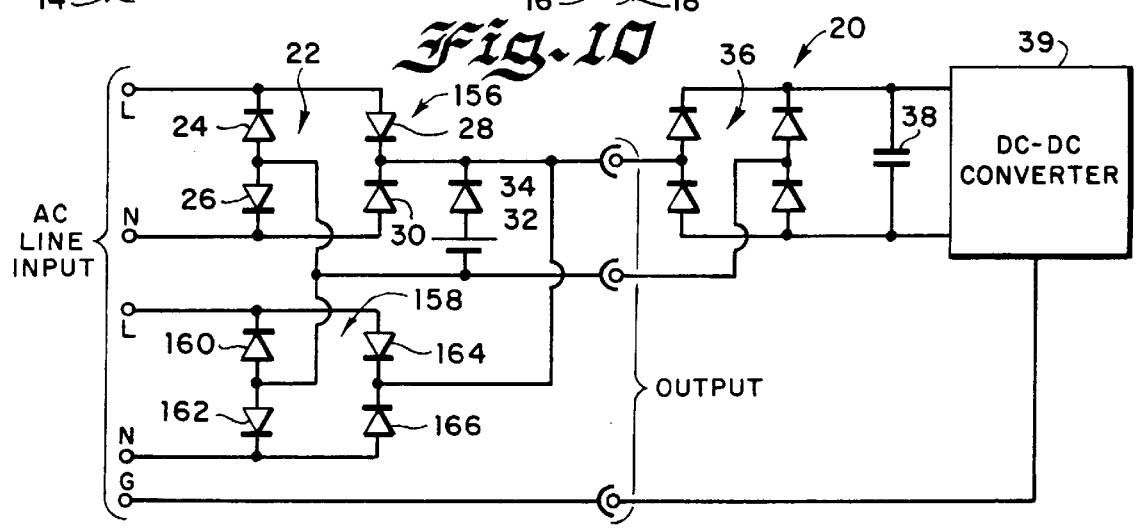

5,874,788

EXTERNAL BACKUP POWER SUPPLY

This application is a continuation of application Ser. No. 07/578,952, filed Sep. 7, 1990, now abandoned.

BACKGROUND OF THE INVENTION

1. Field of the Invention

The present invention relates generally to standby power systems for supplying power to a supported system or device, such as a computer or telephone switching equipment when an AC (alternating current) normal operating supply has a power outage or the AC line voltage drops below a predetermined and adjustable minimum voltage. More particularly, the present invention relates to an external backup power system for supplying DC (direct current) backup power without requiring modification of the supported device.

2. Description of the Prior Art

Backup power systems are increasingly used for applications, such as computer, security, data processing and communications equipment to avoid interruptions resulting from a primary AC power source. Various arrangements have been employed to provide a backup or standby power supply.

Standby supply systems are disclosed in U.S. Pat. Nos. 3,790,822; 4,401,895; 4,327,298; 4,313,060; 4,362,951; 4,366,389; 4,395,639; 4,400,626; 4,647,787; 4,468,571 and 4,885,521. Disadvantages of the known arrangements include complexity, expense and unreliability. Many of the known arrangements require modifications and/or direct wiring interconnections within the power supply circuit of the supported device, such as disclosed by U.S. Pat. Nos. 4,401,895; 4,327,298 and 4,885,521.

U.S. Pat. No. 4,313,060 discloses a continuous-type uninterruptible power supply including a controlled ferroresonant regulator and rectifier combination supplying independent DC outputs and driving an inverter. The inverter is arranged to provide a plurality of AC and DC outputs.

U.S. Pat. No. 4,885,521 discloses a supplemental battery backup power system for computer systems that, in the absence of AC line voltage, supplies DC voltages directly to the computer DC power bus and by-passes the internal, AC, computer power supply. A special harness assembly connects the supplemental battery backup power system with a personal computer. The harness assembly must be adapted for an output array of voltages and currents in a specific, physical arrangement of a power input connector for a specific computer processing unit to which the backup power is supplied.

It is desirable to provide an external backup power system capable of simply and effectively supplying DC (direct current) backup power to a supported device without requiring any modification of the supported device. It is important to provide such backup power supply that can be used with a various devices and that is inexpensive.

SUMMARY OF THE INVENTION

Accordingly, it is an object of the present invention to provide an external DC power supply capable of reliably, effectively and efficiently supplying power to an AC power supply of a supported system when a primary AC operating supply drops below a predetermined and adjustable minimum voltage.

It is another object of the present invention to provide an external DC power supply capable of reliably, effectively and efficiently supplying backup power to an AC power supply of a supported system without requiring any special wiring or modification of the supported AC power supply using only an AC input plug for connection to the supported system.

It is another object of the present invention to provide an external DC power supply capable of reliably, effectively and efficiently supplying backup power to an AC power supply of a supported system without affecting normal operation when backup power is not needed.

It is another object of the present invention to provide an external DC power supply capable of reliably, effectively and efficiently supplying backup DC power directly to an AC line input of an AC power supply of a supported system instantaneously without requiring switching between the AC supply and the backup DC supply.

It is another object of the present invention to provide an external DC power supply that overcomes many of the disadvantages of prior art systems.

In brief, the objects and advantages of the present invention are achieved by an external DC (direct current) power supply for supplying backup DC power to a supported device having an AC input connector. The power supply includes an AC (alternating current) voltage source. A voltage rectifier is coupled to the AC voltage source for rectifying the AC voltage source. An energy storage device coupled in parallel to the voltage rectifier provides a predetermined DC voltage threshold level. A connector of the external DC power supply applies a power output of the parallel combination of the voltage rectifier and the energy storage device to the AC input connector of the supported device.

BRIEF DESCRIPTION OF THE DRAWING

The present invention, together with the above and other objects and advantages, may best be understood from the following detailed description of the embodiment of the invention illustrated in the drawing, wherein:

FIGS. 4–10 are electrical schematic diagram representations of alternative external DC power supplies arranged in accordance with the principles of the present invention.

DETAILED DESCRIPTION OF THE PREFERRED EMBODIMENT

Figure 1:
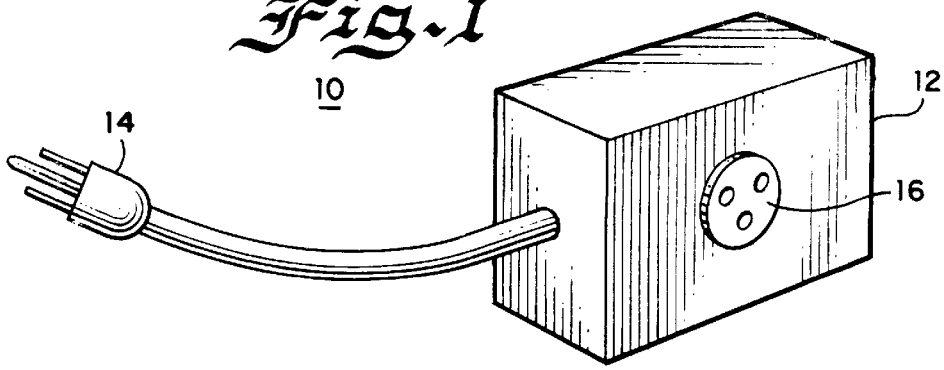
FIG. 1 is a perspective view of an external DC power supply in accordance with the principles of the present invention.
Figure 2:
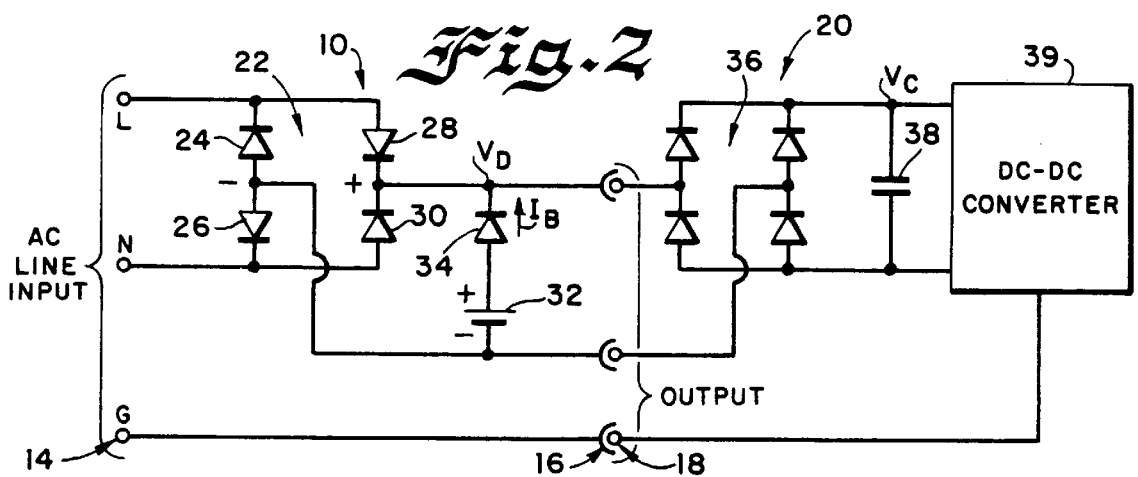
FIG. 2 is an electrical schematic diagram representation of the external DC power supply of FIG. 1 together with an AC power supply of a supported system.

Referring now to the drawing, in FIGS. 1 and 2 there is illustrated an external DC power supply generally designated by the reference numeral 10. The external DC power supply 10 is a separate module including a housing 12. At its INPUT, the external DC power supply 10 includes an AC input plug 14 for connecting to a primary AC line input and at its OUTPUT, the external DC power supply 10 includes an AC output receptacle 16 for connecting to an AC input plug 18 of a supported device generally designated as 20. Additionally, a safety adapter (not shown) could be used between a nonstandard output receptacle 16 and the AC input plug 18 to prevent use of the supply 10 by a non-compatible device 20.

As shown in FIG. 2, the DC power supply 10 includes a bridge rectifier 22 including four diodes 24, 26, 28 and 30, and a series connected combination of a battery 32 and a diode 34 connected across the + and − center connections of the bridge rectifier 22. At the junction $V_D$ of diode 34 and the + center connection of the bridge rectifier 22, a predetermined DC voltage threshold level or amplitude is selectively provided by the rating of the battery 32. Battery 32 supplies battery current only when the RMS value of the AC line input supply drops below the predetermined threshold amplitude at junction $V_D$ as illustrated in FIG. 3.

Although various different arrangements can be used within the supported device, the conventional source of AC line voltage is full-wave rectified at its input to provide a DC voltage. Typically, the supported device includes a bridge rectifier 36 including four diodes, as shown. The rectifier 36 is connected in parallel with a filtering capacitor 38 providing a rectified DC voltage input $V_C$ to a DC-to-DC converter 39. Many different types of DC-to-DC converters are used to provide an array of DC output voltages at various current to be distributed within a particular supported device 20.

Any suitably rated diode can be used for the diodes 24, 26, 28, 30, 32, for examples, such as a device type 1N4722 or 1N1204 having a reverse breakdown rating of 400 volts and a conduction current rating of 3 amperes and 12 amperes, respectively. Various commercially available batteries can be used for the battery 32 that can either be of the rechargeable type or primary cells to be thrown away when discharged. For examples, rechargeable lead-acid or gel-type cells, such as sold by Panasonic Corp. and others can be used for the battery 32. The battery 32 can include multiple 12 volt units that can be stacked to provide the selected voltage $V_D$ in conjunction with the diode 34.

Figure 3:
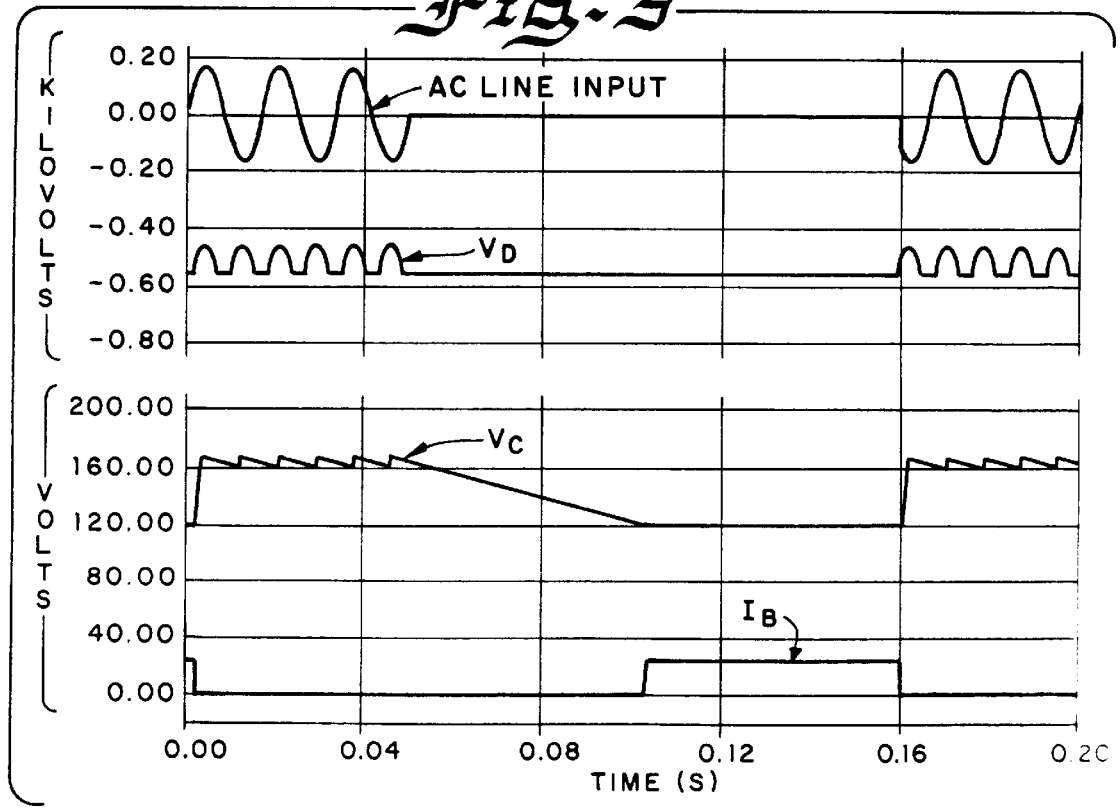
FIG. 3 is chart providing exemplary voltage waveforms to illustrate how operating power is supplied by the external DC power supply of FIG. 1.

FIG. 3 provides exemplary voltage waveforms to illustrate the operation of the external DC power supply 10. At the top chart, voltage levels are represented in Kilovolts versus time in seconds. A first line labelled AC LINE INPUT illustrates near opposite ends a normal sinusoidal AC line voltage with a central zero level power outage portion shown. Next at a line labelled $V_D$, the corresponding voltage levels at $V_D$ in FIG. 2 across the OUTPUT of the external DC power supply 10 are illustrated. At the lower chart, voltage levels are represented in volts versus time in seconds. In the lower chart a line labelled $V_C$ represents the corresponding supply voltage, and a line labelled IB represents the corresponding battery supply current applied to the DC-to-DC converter 39 indicated at $V_C$ across the filtering capacitor 38 in FIG. 2. As shown, normally no DC current is supplied by the battery 32. This is because the supported power supply 20 draws its current only at the peaks of the AC cycle. Following a power outage when the voltage $V_C$ drops to a selected threshold level, DC current is supplied essentially instantaneously by the battery 32 through the diode 34 without requiring any switching between the conventional source of AC line voltage and the external DC power supply 10.

Figure 4:
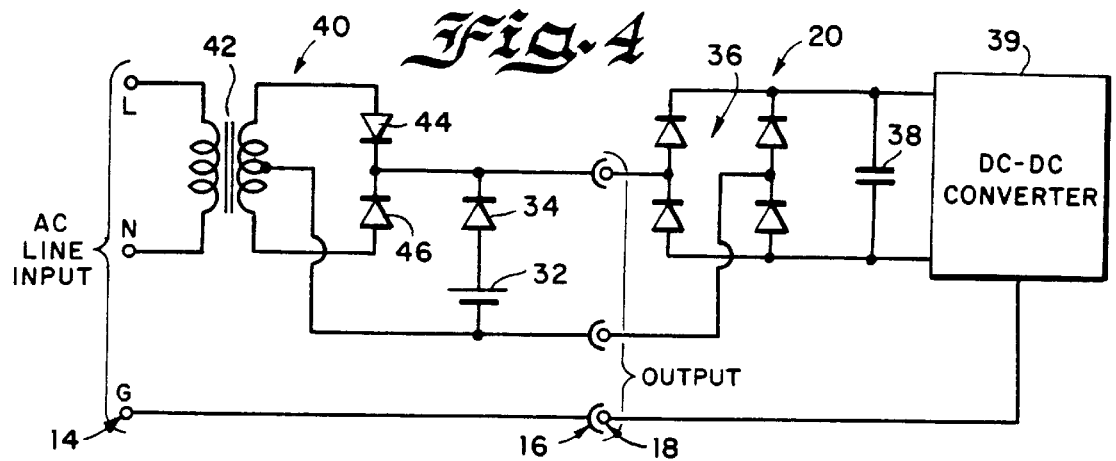

In FIG. 4, there is shown an alternative external DC power supply, generally designated by the reference numeral 40, together with the supported device 20. External DC power supply 40 uses an alternative rectifier than the bridge rectifier 20 in FIG. 1. The same reference numerals are used in FIG. 4 for similar components of FIG. 1. External DC power supply 40 includes a split phase transformer 42 in parallel with a pair of oppositely polled diodes 44 and 46, as shown. The series connected battery 32 and diode 34 is connected between a center tap of the split phase transformer 42 and at the anode junction connection of the diodes 32 and 34 to provide similar backup power functions as the external DC power supply 20.

Figure 5:
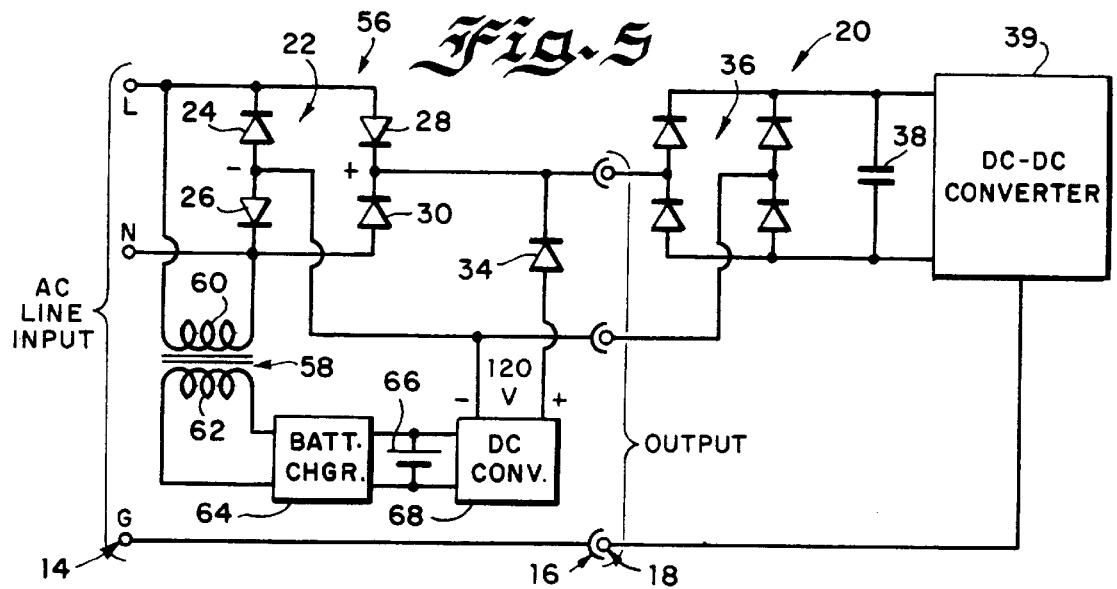

In FIG. 5, there is shown an alternative external DC power supply generally designated by the reference numeral 56 together with the supported device 20. The same reference numerals are used in FIG. 5 for similar components of FIG. 1. External DC power supply 56 further includes a transformer 58 having its primary winding 60 connected across LINE and NEUTRAL of the AC line input voltage. The secondary winding 62 of the transformer 58 provides an AC voltage supply to a battery charger 64. The battery charger 64 is connected in parallel with a battery 66 for charging the battery 66. The battery 66 is connected in series with a DC converter 68 and diode 34 for providing the desired voltage level at the junction $V_D$. For example, a 12 volt battery 66 can be used with the DC converter 68 adapted for providing a 120 volt DC level at its output.

Figure 6:
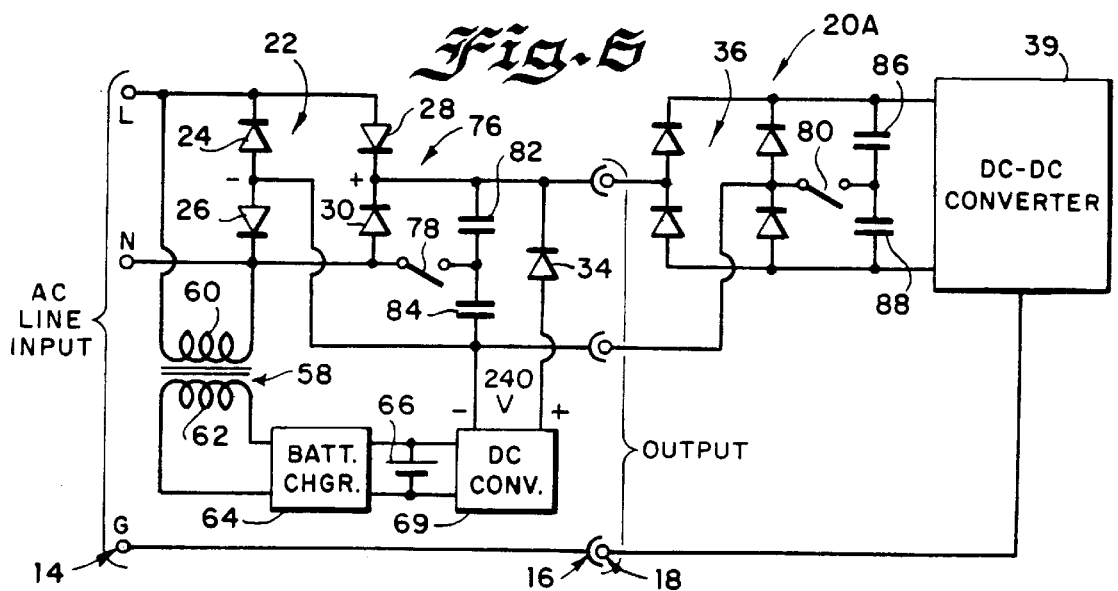

In FIG. 6, there is shown an alternative external DC power supply generally designated by the reference numeral 76 together with a supported device 20A including a voltage doubler arrangement. The same reference numerals are used in FIG. 6 for similar components of FIGS. 1 and 5. External DC power supply 76 is similar to the supply 56 of FIG. 5 further adapted for selective operation with either an AC line input supply of 120 volts nominal or 240 volts nominal. The external DC power supply 76 further includes a DC converter 69 providing double the voltage amplitude of the DC converter 68 of FIG. 5. For example, the DC voltage output of converter 69 can be about 240 volts as compared to a DC voltage output of 120 volts for the DC converter 68. The external DC power supply 76 further includes a manually operable switch 78 for use in conjunction with a manually operable switch 80 provided within the supported device 20. A pair of additional capacitors 82 and 84 of the external DC power supply 76 are connected in series across the center connections of the bridge rectifier 22. Nominal voltage selecting switch 78 is connected between the junction of capacitors 82 and 84 and the NEUTRAL of the AC line input. The supported device 20A includes a pair of capacitors 86 and 88 in conjunction with the switch 80, as shown.

In operation the nominal voltage selecting switch 78 is closed for an AC line input supply of 120 volts nominal with the supported device switch 80 in the closed position. The nominal voltage selecting switch 78 is opened for an AC line input supply of 240 volts nominal with the supported device switch in the open position.

In FIG. 7, there is shown an alternative external DC power supply generally designated by the reference numeral 90 together with a supported device 20B adapted for 3-phase operation. At its input, the external DC power supply 90 includes a 3-phase AC plug 92 for connection with the 3-phase AC line supply. A 3-phase AC plug 94 of the supported device 20B is connected to a corresponding receptacle 96 of the external DC power supply 90, as shown. The external DC power supply 90 includes a 3-phase bridge rectifier 98 including six diodes 100, 102, 104, 106, 108 and 110. The external DC power supply 90 includes a series connected combination of a battery 112 and a diode 114 connected across the 3-phase bridge rectifier 98.

The supported device 20B includes a 3-phase bridge 118 including six diodes 120, 122, 124, 126, 128 and 130 with a filtering capacitor 132 connected across the 3-phase bridge 118. The parallel combination of the series connected battery 112 and diode 114 and the 3-phase rectifier 98 is connected via receptacle 96 and 3-phase plug 94 to the 3-phase bridge 118, as shown. The external DC power supply 90 provides similar backup power functions for 3-phase operation as the external DC power supply 20.

In FIG. 8, there is shown an alternative external DC power supply generally designated by the reference numeral 136 together with the supported device 20. The same reference numerals are used in FIG. 8 for similar components of FIG. 1. External DC power supply 136 includes a capacitor 138 replacing the battery 32 and diode 34 combination of FIG. 1. The capacitor 138 provides a backup current source for a time period of a selected number of cycles proportional to its energy storage capacity. A 250 volt or 450 volt rated capacitor having a capacitance rating in a range between 250–10,000 microFarad advantageously is used for the capacitor 138. Various commercially available capacitors can be used for the capacitor 138, for example, such as, an aluminum electrolytic type Series 36DX sold by Sprague, Inc.

In FIG. 9, there is shown an alternative external DC power supply generally designated by the reference numeral 146 together with the supported device 20. The same reference numerals are used in FIG. 9 for similar components of FIGS. 1 and 8. External DC power supply 146 further includes a resistor 148 and a diode 150 in combination with the capacitor 138, as shown. The resistor 148 provides a path for slowly charging the capacitor 138 during normal operation of the AC line input. The capacitor 138 is discharged through the diode 150 when the AC line input power fails.

In FIG. 10, there is shown an alternative external DC power supply generally designated by the reference numeral 156 together with the supported device 20. The same reference numerals are used in FIG. 10 for similar components of FIG. 1. External DC power supply 156 includes a second bridge rectifier 158 including four diodes 160, 162, 164 and 166. The bridge rectifier 158 is connected at its input to an alternative AC power source. The series connected combination of the battery 32 and diode 34 is connected across the + and – center connections of the bridge rectifier 158. External DC power supply 156 provides backup battery power to the supported device 20 in the event of failure of both the normal AC line power and the alternative AC power source. The normal AC line power and the alternative AC power source are not required to be synchronous or to have the same frequency.

In summary, multiple external DC power supply arrangements have been provided for simply and economically providing backup power for various types of supported devices. A significant advantage of all of these external DC power supplies is that the need for access to wiring within a particular supported device is eliminated.

While the invention has been described with reference to details of the illustrated embodiment, these details are not intended to limit the scope of the invention as defined in the appended claims.

I claim:

1. An external DC (direct current) power supply for supplying DC power to a supported device having an AC input connector adapted for connecting the supported device to an AC voltage source and the supported device including an internal voltage rectifier connected to the AC input connector, comprising:

an AC (alternating current) voltage source;

voltage rectifier means coupled to said AC voltage source for rectifying said AC voltage source;

energy storage means coupled in parallel with an output of said voltage rectifier means for providing a predetermined DC voltage threshold level;

connector means for applying a DC power output of said parallel combination of said rectifier means and said energy storage means to the voltage rectifier of the supported device, said connector means being connected to the AC input connector of the supported device;

said energy storage means supplying current only when said voltage rectifying means provides a rectified voltage level below said predetermined DC voltage threshold level thereby providing backup DC power to the supported device; and said AC input connector of the supported device being connected only to said external DC power supply.

2. An external DC power supply as recited in claim 1 wherein said AC (alternating current) voltage source is a primary AC line input.

3. An external DC power supply as recited in claim 1 wherein said voltage rectifier means is a full-wave rectifier.

4. An external DC power supply as recited in claim 1 wherein said voltage rectifier means is a diode bridge rectifier.

5. An external DC power supply as recited in claim 1 wherein said voltage rectifier means includes a split phase transformer connected in parallel with a pair of oppositely poled diodes.

6. An external DC power supply as recited in claim 1 wherein said an AC (alternating current) voltage source is a 3-phase AC line supply and said voltage rectifier means includes a six diode bridge rectifier.

7. An external DC power supply as recited in claim 1 wherein the supported device includes a voltage doubler arrangement and said external DC power supply further comprises a voltage doubler arrangement.

8. An external DC power supply as recited in claim 7 wherein said voltage rectifier means is a bridge rectifier and wherein said voltage doubler arrangement of said external DC power supply includes a switch moveable between an opened position and a closed position, series connected capacitance means connected in parallel with said energy storage means and connected between + and – center connections of said bridge rectifier; and said switch connected between a junction of said capacitance means and a NEUTRAL connection of said AC voltage source connected to said bridge rectifier.

9. An external DC power supply as recited in claim 1 wherein said energy storage means includes a battery.

10. An external DC power supply as recited in claim 9 wherein said energy storage means includes a diode connected in series with said battery, said voltage rectifier means is a diode bridge rectifier and said series connected battery and diode is connected across an output of said diode bridge rectifier.

11. An external DC power supply as recited in claim 1 wherein said energy storage means includes a capacitor.

12. An external DC power supply as recited in claim 11 further comprising a parallel combination of a resistor and a diode connected in series with said capacitor.

13. An external DC power supply as recited in claim 12 wherein said voltage rectifier means is a diode bridge rectifier and wherein said series combination of said capacitor and said resistor and diode is connected across an output of said diode bridge rectifier.

14. An external DC power supply as recited in claim 1 wherein said connector means comprises an AC voltage receptacle providing GROUND, LINE and NEUTRAL connections.

15. An external DC power supply as recited in claim 1 wherein the AC input connector of the supported device is an AC voltage plug connector.

16. An external DC power supply as recited in claim 1 further comprising a housing containing said external DC power supply.

17. A unitary external DC (direct current) power supply for supplying DC power to a supported device having an AC input connector adapted for connecting the supported device to an AC voltage source and having an internal rectifier connected to the AC input connector, comprising in combination:

a housing for containing said unitary external DC power supply;

an AC (alternating current) voltage source connected to said unitary external DC power supply;

voltage rectifier means of said unitary external DC power supply contained within said housing and coupled to said AC voltage source for rectifying said AC voltage source;

energy storage means contained within said housing and coupled in parallel with an output of said voltage rectifier means for providing a predetermined DC voltage threshold level;

connector means associated with said housing for providing a DC power output of said parallel combination of said voltage rectifier means and said energy storage means to the internal rectifier of the supported device, said connector means being connected to the AC input connector of the supported device; and said energy storage means supplying current only when said voltage rectifying means provides a rectified voltage level below said predetermined DC voltage threshold level thereby providing backup DC power to the supported device.

18. An external DC power supply as recited in claim 17 wherein said energy storage means includes a battery.

19. An external DC power supply as recited in claim 17 wherein said energy storage means includes a capacitor.

20. An external DC (direct current) power supply for supplying DC power to a supported device having an AC input connector adapted for connecting the supported device to an AC voltage source and having an internal rectifier connected to the AC input connector, comprising:

an AC (alternating current) voltage source;

full wave voltage rectifier means coupled to said AC voltage source for rectifying said AC voltage source providing at its output a rectified AC voltage having a threshold RMS value;

energy storage means coupled in parallel with said output of said full wave voltage rectifier means for providing a predetermined DC voltage value, said predetermined DC voltage value being less than said threshold RMS value of said rectified AC voltage;

connector means for applying a DC power output of said parallel combination of said rectifier means and said energy storage means to the internal rectifier of the supported device, said connector means being connected to the AC input connector of the supported device; and said energy storage means supplying current only when said voltage rectifying means provides a rectified voltage level below said predetermined DC voltage threshold level thereby providing backup DC power to the supported device.

21. A method of supplying DC power to a supported device having an AC input connector adapted for connecting the supported device to an AC voltage source and having an internal voltage rectifier connected to the AC input connector, comprising the steps of:

rectifying an AC voltage source with a rectifier circuit for providing a rectified voltage signal having a threshold RMS value;

providing an energy storage device in parallel with said rectifier circuit for supplying current only when said rectified voltage signal is below a predetermined DC voltage threshold level; and applying a DC power output of said parallel combination of said rectifier circuit and said energy storage device to the internal voltage rectifier of the supported device.

22. A method as recited in claim 21 wherein said step of applying a DC power output of said parallel combination of said rectifier circuit and said energy storage device to the internal rectifier of the supported device includes the step of:

connecting said parallel combination of said rectifier circuit and said energy storage device to the AC input connector of the supported device.

23. A method as recited in claim 21 further includes the step of:

providing a housing for enclosing said parallel combination of said rectifier circuit and said energy storage device.

24. A method as recited in claim 23 further includes the step of:

providing a connector extending from said housing for connecting to a primary AC line input; and providing a receptacle with said housing for connecting to the AC input connector of the supported device.

* * * * *